United States Patent [19]

Schroll

[11] 4,142,034

[45] Feb. 27, 1979

[54] EPOXY RESIN COMPOSITIONS CONTAINING AN AMINE-CYANIC ACID ESTER COMBINATION CURING AGENT

[75] Inventor: Gene E. Schroll, Cincinnati, Ohio

[73] Assignee: Cincinnati Milacron Inc., Cincinnati, Ohio

[21] Appl. No.: 894,715

[22] Filed: Apr. 10, 1978

[51] Int. Cl.² .................................................. C08G 59/56
[52] U.S. Cl. ......................................... 528/120; 528/93; 528/98; 528/99; 528/361; 528/367; 528/407
[58] Field of Search .................. 528/93, 98, 120, 99, 528/361, 367, 407

[56] References Cited

U.S. PATENT DOCUMENTS

| 3,420,794 | 1/1969 | May et al. | 260/47 |
| 3,562,214 | 2/1971 | Kubens et al. | 260/47 |

*Primary Examiner*—Harold D. Anderson
*Assistant Examiner*—E. A. Nielsen
*Attorney, Agent, or Firm*—Donald Dunn

[57] ABSTRACT

Epoxy resin compositions comprising a) a 1,2-epoxide compound containing two or more 1,2-epoxide groups per molecule, b) a cyanic acid ester having two or more cyanic ester groups per molecule, and c) an organic amine are provided.

16 Claims, No Drawings

EPOXY RESIN COMPOSITIONS CONTAINING AN AMINE-CYANIC ACID ESTER COMBINATION CURING AGENT

DESCRIPTION OF THE INVENTION

This invention relates to epoxy resin compositions comprising a) a 1,2-epoxide compound having two or more 1,2-epoxide groups per molecule and in synergistic combination, b) a cyanic acid ester having two or more cyanic acid ester groups per molecule, and c) an organic amine having at least two amine hydrogen atoms per molecule. Additionally, this invention relates to the process of curing epoxy resins in the presence of a synergistic combination of a cyanic acid ester having two or more cyanic acid ester groups per molecule and an organic amine having at least two amine hydrogen atoms per molecule.

BACKGROUND

In commercial practice in the plastic art, particularly the thermosetting resin art, there exists continuous efforts to reduce the cure times of resins consistent with obtaining products of acceptable performance and appearance. The reduction of cure times improves and often makes attractive the economics of plastic molding processes, adhesives and coatings. Further, reduced cure times can lower unit costs and improve productivity.

Efforts to increase curing speed are particularly prevalent in the epoxy resin art and many materials and combinations of materials have been taught by the art for achieving rapid cure of epoxy resins. However, there often is encountered in the prior art fast cure of epoxy resins, an adverse effect on one or more physical properties (e.g. clarity, color, impact resistance and hardness to name a few) of the cured resin as compared to a slow cured resin system. Such adverse effects (e.g. reduction in clarity, darker color and lower impact resistance) often limits the usefulness or excludes the use of fast curing epoxy resin systems in many applications and thereby restricts, if not precludes the use of many prior art materials or combinations of materials for curing epoxy resins. Thus, in the epoxy resin art it is desired to employ materials or combinations of materials which provide rapid cure of the epoxy resin while having little or no effect on the physical properties of the cured epoxy resin.

SUMMARY OF THE INVENTION

It has now been found that the cure of an epoxy resin may be achieved by employing in the epoxy resin a synergistic combination of an amine and a cyanic acid ester compound. Thus in accordance with this invention, there is provided an epoxy resin composition comprising a) a poly(1,2-epoxide), b) an organic amine having at least two amine hydrogens, and c) a cyanic acid ester.

DESCRIPTION OF THE INVENTION

The epoxy resin compositions of this invention comprise a) a poly(1,2-epoxide) and in synergistic combination, b) an organic amine having at least two amine hydrogens per molecule, and c) a cyanic acid ester compound. In a more particular aspect according to this invention there are provided epoxy resin compositions comprising a) a poly(1,2-epoxide) and in synergistic combination, b) an organic amine having at least two amine hydrogens per molecule, and c) a cyanic acid ester compound having the general formula $R(O-C\equiv N)_x$ wherein R is an aromatic radical optionally containing bridging members and having a free valence equal to X and the $(O-C\equiv N)$ group is always bonded to an aromatic nucleus and X is an integer of at least 2.

The epoxy resin compositions of this invention are useful in the making of reinforced plastic laminates, particularly glass fiber reinforced plastic laminates, as adhesive and as coatings. Further, the epoxy resin compositions of this invention would find use in the making of plastic castings.

As one embodiment of this invention there is provided epoxy resin compositions comprising a) a poly(1,2-epoxide) and in synergistic combination, b) an organic primary amine having at least one primary amine group per molecule, and c) a cyanic acid ester compound having the general formula $R(O-C\equiv N)_x$ wherein R is an aromatic radical optionally containing bridging groups and having a free valence equal to X and X is an integer of at least 2, the $(O-C\equiv N)$ groups always being bonded to an aromatic nucleus.

In another embodiment of this invention there is provided epoxy resin compositions comprising a) a poly(1,2-epoxide) and in synergistic combination, b) an organic secondary amine having at least two secondary amine groups per molecule, and c) a cyanic acid ester compound having the general formula $R(O-C\equiv N)_x$ wherein R is an aromatic radical optionally containing bridging groups and having a free valence equal to X and X is an integer of at least 2, the $(O-C\equiv N)$ groups always being bonded to an aromatic nucleus.

In a preferred practice of this invention, epoxy resin compositions are provided which comprise a) a poly(1,2-epoxide) and in synergistic combination, b) at least one aromatic primary amine, and c) a cyanic acid ester compound having the formula $R(O-C\equiv N)_x$ wherein R is an aromatic radical optionally containing bridging groups and having a free valence equal to X and X is an integer of at least 2, the $(O-C\equiv N)$ groups always being bonded to an aromatic nucleus. According to a further preferred practice of this invention, there are provided epoxy resin compositions comprising a) a poly(1,2-epoxide) and in synergistic combination, b) a normally room temperature liquid aromatic primary amine or mixture of aromatic primary amines, and c) a cyanic acid ester compound having the general formula $R(O-C\equiv N)_X$ where R is an aromatic radical optionally containing bridging groups and having a free valence equal to X and X is an integer of at least 2, the $(O-C\equiv N)$ groups always being bonded to an aromatic nucleus. In the aforementioned preferred practices of this invention it is further preferred that the cyanic acid esters contain from 2 to 6 cyanic acid ester (i.e. $O-C\equiv N$) groups per molecule and particularly preferred that the cyanic acid esters contain 2 cyanic acid ester (i.e. $O-C\equiv N$) groups per molecule. Desirably, the cyanic acid ester compound should be dispersible or soluble in the poly(1,2 epoxide) at temperatures up to about 150° C.

In the preferred practice of this invention, it is preferred to use organic amines having a boiling point of at least 100° C. and which are soluble or dispersible in the poly(1,2-epoxide). However, although organic amines having a boiling point less than 100° C. are less preferred in the practice of this invention, such organic amines can, under appropriate circumstances (e.g. solvent systems and room temperature cure), be employed.

Where the organic amines usable in the practice of this invention have high melting points (e.g. above 100° C.), it is preferred to use such organic amines in solvent solution.

In the epoxy resin compositions of this invention there may be used as the organic amine in synergistic combination with the cyanic acid ester 1) an aliphatic primary amine having one primary amine group per molecule, 2) an aliphatic primary amine having two or more primary amine groups per molecule, 3) an aromatic primary amine having one primary amine group per molecule, 4) an aromatic primary amine having two or more primary amine groups per molecule, 5) an aliphatic secondary amine having two or more secondary amine groups per molecule, 6) an aromatic secondary amine having two or more secondary amine groups per molecule, 7) an aliphatic amine having both primary and secondary amine groups in the same molecule, 8) an aromatic amine having primary and secondary amine groups in the same molecule, 9) an aralkyl primary amine having one or more primary amine groups per molecule, 10) an aralkyl secondary amine having two or more secondary amine groups per molecule, 11) an alkaryl primary amine having one or more primary amine groups per molecule, 12) an alkaryl secondary amine having two or more secondary amine groups per molecule, 13) an aralkyl amine having both primary and secondary amine groups in the same molecule, 14) an alkaryl amine having both primary and secondary amine groups in the same molecule, 15) a cycloaliphatic primary amine having one or more primary amine groups per molecule, or 16) a cycloaliphatic secondary amine having two or more secondary amine groups per molecule. Polymeric amines having one or more primary amine groups or two or more secondary amine groups or containing at least one primary and one secondary amine group wherein the primary amine group may be a pendant or terminal primary amine group and the secondary amine group may be a pendant, terminal or internal chain secondary amine group may be used in the practice of this invention.

Mixtures of organic amines may be used in accordance with this invention. Thus, there may be used mixtures of 1) alphatic primary amines having one or more primary amine groups per molecule, 2) aliphatic secondary amines having two or more secondary amine groups per molecule, 3) alphatic primary amines having one or more primary amine groups per molecule and aliphatic secondary amines having two or more secondary amine groups per molecule, 4) aromatic primary amines having one or more primary amine groups per molecule, 5) aromatic secondary amines having two or more secondary amine groups per molecule, 6) aromatic primary amines having one or more primary amine groups per molecule and aromatic secondary amines having two or more secondary amine groups per molecule, and 7) polymeric amines. The use of mixtures of polymeric amine and aliphatic primary amine, aliphatic secondary amine, aromatic primary amine or aromatic secondary amine are also contemplated. Further, it is contemplated that fatty amines having one or more primary amine groups per molecule or two or more secondary amine groups per molecule may be used in this invention.

Preferably the organic amine used in accordance with this invention should have a melting point of not more than about 100° C. More preferably, it is desirable to use in this invention organic amines which are liquid at room temperature since the liquid organic amine is more readily mixed into the epoxy resin with little or no heating. Aliphatic primary and aliphatic secondary amines as used in this invention preferably have a saturated hydrocarbon aliphatic moiety attached to the amine nitrogen. In respect to the aromatic primary and aromatic secondary amines usable in this invention it is preferred to use a non-condensed aromatic ring attached to the amine nitrogen. Aromatic primary and secondary amines which are liquid at about room temperature or melt below 100° C. are also preferred.

Aliphatic primary amines usable in the practice of this invention include for example, but are not limited to, methyl amine, butyl amine, isopropyl amine, hexyl amine, octyl amine, 2 ethyl hexyl amine, octadecyl amine, ethylene diamine, propylene diamine, 1,8-diaminooctane, 1,12-diaminododecane and tetraethylene pentamine. As aliphatic secondary amines there may be employed, for example, N,N'-diethylethylene diamine, N,N'-dimethyl propylene diamine, and N,N'-dibenzyl ethylene diamine. Aliphatic mixed primary and secondary amine compounds such as for example N-methyl ethylene diamine and N-propyl-1,12-diaminododecane may be used in accordance with this invention.

As examples of aromatic primary amines usable in the practice of this invention there include, but not limited to, aniline, O-phenylene diamine, p-phenylene diamine, m-phenylene diamine, o-ethyl aniline, m-ethyl aniline and p-ethyl aniline, m-anisidine and m-toluidine. Aromatic secondary amines and mixed secondary and primary amine which are usable include but not limited to N,N'-dimethyl-p-phenylene diamine, N,N' dipropyl-m-phenylene diamine, N-phenyl-p-phenylene diamine and N-methyl-p-phenylene diamine. Other organic amines usable in the practice of this invention include, for example, benzyl amine, 3-phenyl-1-propyl amine, 6-phenyl-1-hexyl amine, 12-phenyl-1-dodecyl amine, 2,2-diphenyl ethyl amine, m-xylylene diamine, p-xylylene diamine, N,N'-dimethyl-m-xylylene diamine, N-ethyl-p-xylylene diamine, 2,6-diisopropyl aniline, 3,5-dimethyl aniline, 2,4,6-trimethyl aniline.

Various commercially available proprietary amine products having available only a generic description and falling within the previously described organic amines are also usable in the practice of this invention and are exemplified by 1) a clear red low viscosity liquid aromatic diamine having a viscosity range of 2000 to 5000 centipoises at 25° C. and an amine value range of 9.9 to 12.5 available from the Ciba Geigy Corp. under the name XU 205, 2) a dark liquid modified aromatic polyamine having a viscosity range of 15 to 40 poises at 25° C. and an amine nitrogen content range of 17 to 19% available from Shell Chemical Company under the name Epon Curing Agent ® Z, 3) a liquid aromatic amine having a viscosity range of 1000 to 2000 centipoises at 77° F., an equivalent of 43 and a flash point of about 365° F. available from the Celanese Corp. under the name Epi-Cure ® 841, 4) a modified aliphatic amine having a viscosity of 10 to 25 centipoises at 77° F., an equivalent weight of about 76 and a flash point of about 210° F. obtainable from the Celanese Corp. under the name Epi-Cure ® 890, and 5) a polymeric amido-amine having a viscosity range of 15,000 to 35,000 centipoises at 77° F., an equivalent weight of about 116 and a flash point of about 500° F. available from the Celanese Corp. under the name Epi-Cure ® 858.

As can be recognized from the above description there can be used in the practice of this invention a wide variety of organic amines the requirement being that the organic amine shall have at least two amine hydrogen atoms per molecule. In the context of this disclosure and invention the phrase shall have at least two amine hydrogen atoms per molecule means that the organic amine molecule will have at least two hydrogen atoms which are bonded to the same or different amino nitrogen atoms in the molecule.

The cyanic acid esters having the general formula $R(O-C\equiv N)_x$ as herein defined, which are usable in the practice of this invention, include the cyanic acid esters disclosed and taught in U.S. Pat. No. 3,562,214 the entire disclosure of which is incorporated herein by reference. Methods for the preparation of cyanic acid esters usable in the practice of this invention are disclosed in U.S. Pat. No. 3,562,214 and French Pat. No. 1,289,079. Exemplary of the cyanic acid esters usable in the practice of this invention is the bis cyanic acid ester of 4,4' dihydroxy diphenyl dimethyl methane [i.e. 2,2-bis-(4-cyanatophenyl) propane].

The poly(1,2-epoxide) in the practice of this invention is an epoxy material having a plurality of 1,2 epoxide, preferably glycidyl, groups which are bonded through oxygen or nitrogen in the molecule, as is well-known in the art, and are typically prepared by the reaction of epichlorohydrin with a poly hydroxy, aromatic amine or polycarboxylic acid compound.

Polyepoxides which are polyglycidyl ethers of 4,4'-dihydroxy diphenyl methane, 4,4' dihydroxy diphenyl sulfone or tris(4-hydroxy-phenyl) methane are useful in this invention. There may be used in the practice of this invention the reaction product of epichlorohydrin and amines such as N,N diglycidyl propylaniline, N,N,N',N' tetraglycidyl 4,4'-diamino-diphenyl methane, O,N,N-triglycidyl-4-amino-phenol or N,N'-dimethyl-N,N' diglycidyl 4,4'-diamino-diphenylmethane. Also usable are the gylcidyl esters of carboxylic acids. Such glycidyl esters include for example diglycidyl phthalate and diglycidyl adipate. Polyepoxides prepared from polyols such as 2,2 di(4-hydroxy phenyl)propane, pentaerythritol, glycerol, butane diol or trimethylol propane and an epihalohydrin are also useful. There may also be used such polyepoxides as triglycidyl cyanurates and isocyanurates, N,N-diglycidyl, oxamides, N,N'-glycidyl derivatives of hydantoins, diglycidyl esters of cycloaliphatic dicarboxylic acids, and polyglycidyl thioethers of polythiols.

Methods well-known in the art for compounding epoxy resin compositions may be used to prepare the poly(1,2-epoxide) compositions of this invention. In accordance with one method the cyanic acid ester compound may be blended into the poly(1,2-epoxide), preferably at elevated temperature, and then the organic amine added and blended into the poly(1,2-epoxide)/cyanic acid ester mixture. In another method the cyanic acid ester and the organic amine may be simultaneously blended into the poly(1,2-epoxide). In still another method separate mixtures of cyanic acid ester in poly(1,2-epoxide) and organic amine in poly(1,2-epoxide) may be prepared and then these two mixtures combined. Blending of the cyanic acid ester into the poly(1,2-epoxide) and the organic amine into the poly(1,2-epoxide) may be carried out at room temperature or at a suitable elevated temperature, usually not greater than the melting point the material being blended into the poly(1,2-epoxide), to reduce the viscosity of the poly(1,2-epoxide), to facilitate the blending process and to insure complete and uniform dispersion of the cyanic acid ester compound and amine. Where a liquid is to be blended into the poly(1,2-epoxide) an elevated temperature will usually not be necessary except as may be desired to reduce the viscosity of the poly(1,2-epoxide) and thereby facilitate the blending process.

In accordance with the practice of this invention, the cyanic acid ester may be employed in a concentration from about 0.05 to about 1.0 equivalent weights of cyanic acid ester compound per epoxide equivalent weight of the poly(1,2-epoxide). As used herein the equivalent weight of cyanic acid ester compound is the weight in grams of cyanic acid ester per cyanic acid ester group obtained by dividing the number of cyanic acid ester groups per molecule into the molecular weight of the cyanic acid ester compound and the epoxide equivalent is the weight in grams of poly(1,2-epoxide) per 1,2-epoxide group. The organic amine employed in the practice of this invention may be used in an amount from about 0.8 to about 1.1 (preferably from about 0.95 to about 1.05) equivalent weights of amine per epoxide equivalent of the poly(1,2-epoxide). As used herein the equivalent weight of amine is the weight in grams of organic amine per amine hydrogen. Thus, for example, an organic amine having a molecular weight of 100 and two amine hydrogens per molecule would have an equivalent weight of 50 grams.

Various additives commonly known and used in the art in epoxy resins may be used in conjunction with the poly(1,2-epoxide) compositions of this invention. Thus, there may be employed known fillers, pigments, dyes, reinforcing fibers, solvents.

Epoxy resins compositions having increased curing speed (e.g. short cure time) over the epoxy resin containing a cyanic acid ester compound alone and over the epoxy resin containing an organic amine alone are realized in accordance this invention. Further, there may advantageously be obtained in accordance with the practice of this invention cured epoxy resins having improved impact strength, cured epoxy resin being the resin obtained upon the reaction of essentially all of the epoxide groups in the epoxy resin.

In the curing of epoxy resins the onset of gelation of the resin signals the start of the curing process. This onset of gelation is usually accompanied by a temperature rise for the resin where the gelation occurs at room temperature and often where gelation occurs at an elevated temperature. Typically, as the gelation time (i.e. the time to the onset of gelation) decreases the rate of cure of the epoxy resin increases. This leads to shorter cure times at room or elevated temperature.

In cases of this invention where rapid gelation occurs on mixing of the compositions of this invention such rapid gelation could be advantageous in the coating art since the application of heavy wet coatings without the problem of sagging becomes feasible. Thus, in such rapid gelling systems, a solvent solution of epoxy resin and cyanic acid ester compound could be mixed, immediately prior to coating a surface, with a solvent solution of amine. Alternatively for example, a liquid amine could be added and mixed into a solvent solution of epoxy resin and cyanic acid ester or a non-solvent mixture of epoxy resin and cyanic acid ester immediately prior to the application of the coating to the surface. Similarly, in the adhesive bonding art the rapid gelling embodiments of this invention would be advantageous in securing the rapid bonding together of surfaces and the rapid development of a strong adhesive bond (i.e. joint). Such rapid development of a strong adhesive bond reduces or eliminates tendencies for subsequent misalignment of the joint during the cure of the adhesive and facilitates the earlier utilization of the adhesively joined members.

This invention and the practice thereof is further described in the following examples. The following examples are not intended to be limiting on the invention and practice thereof. In the following examples all amounts, ratios and percentages are intended to be by weight and all temperatures are intended to be in degrees Centigrade unless otherwise specified.

EXAMPLES 1-33

The epoxy resin compositions of the examples shown in the following table were prepared by the following described methods.

A. Wherein the composition was for a mixture of epoxy resin and cyanic acid ester compound only, the epoxy resin was heated to 100° C. and then cyanic acid ester compound (KL 3-4006 from Mobay Corp.) was added and blended into the epoxy resin. Alternatively, the cyanic acid ester compound (KL 3-4006 from Mobay Corp.) was added to and mixed with the epoxy resin at room temperature and the mixture heated to 100° C. whereupon further mixing was conducted to uniformly disperse the cyanic acid ester compound in the epoxy resin. In both procedures the mixture was allowed to cool to room temperature upon completion of the mixing at elevated temperature.

B. Wherein the composition was for a mixture of epoxy resin and liquid organic amine (i.e. normally liquid at room temperature) the liquid organic amine was added to and blended into the epoxy resin at room temperature.

C. Wherein the composition was for a mixture of epoxy resin and a solid organic amine (i.e. normally solid at room temperature) the solid organic amine was added to and blended into the epoxy resin which had been previously heated to at or near the melting point of the solid organic amine or alternatively the solid organic amine and epoxy resin were initially blended together at room temperature and the resulting mixture heated to at or near the melting point of the solid organic amine. The heated mixture was then further mixed until a uniform dispersion of the organic amine in the epoxy resin was obtained, after which the mixture was permitted to cool to room temperature.

D. Wherein the epoxy composition was for a mixture of epoxy resin, cyanic acid ester compound and a liquid organic amine a mixture of epoxy resin and cyanic acid ester compound was prepared as described in A above. To the resulting mixture of epoxy resin and cyanic acid ester compound at room temperature there was added and mixed in the liquid organic amine.

E. Wherein the epoxy composition was for a mixture of epoxy resin, cyanic acid ester compound and solid organic amine the mixture of epoxy resin and cyanic acid ester compound prepared as in A above was heated to at or near the melting point of the solid organic amine and then the solid organic amine added to and mixed into the heated mixture of epoxy resin and cyanic acid ester compound.

As an alternative procedure to D and E above, a mixture of epoxy resin and cyanic acid ester compound prepared as described in A above may be added to and mixed with, at room temperature, or suitable elevated temperature, a mixture of epoxy resin and organic amine prepared as described in B and C above.

| Exm. No. | Epoxy | Am't of KL 3-40006* | Amine | Am't of Amine* | Cure | Remarks |
|---|---|---|---|---|---|---|
| 1 | Epon 828 | 25 | — | — | 6 hrs. at 150° C. | — hard brittle casting |
| 2 | Epon 828 | 1.01 | — | — | 1 hrs. at 150° C.<br>4 days at RT | — fluid hot; viscous cold<br>— viscous |
| 3 | Epon 828 | 100 | — | — | — | — blended at 100° C - crystallized on cooling |
| 4 | Epon 828 | 66.7 | — | — | — | — crystallized upon standing at RT over weekend |
| 5 | Epon 828 | 42.9 | — | — | — | — 2 days at RT - clear |
| 6 | Epon 828 | 42.9 | — | — | 1 hr. at 150° C.<br>85' at 150° C. | — liquid<br>— gelled; hard, clear when cold |
| 7 | Epon 828 | 25 | Tetraethylene pentamine | 8.4 | RT<br>90' at 100° C. | — gelation begins upon mixing<br>— hard lumps |
| 8 | Epon 828 | 19.8 | tetraethylene pentamine | 0.84 | RT<br>5' at RT<br>1 hr. at 100° C. | — gelation and slight exotherm upon mixing<br>— soft gel<br>— soft gel |
| 9 | Epon 828 | 25 | Epi-Cure 890 (Celanese) | 18.75 | RT<br>45' at 100° C.<br>215' at 100° C.<br>overnight at RT | — gelled during mixing - slight exotherm<br>— soft sticky<br>— soft when hot<br>— hard, brittle |
| 10 | Epon 828 | 25 | Epi-Cure 858 (Celanese) | 34.4 | RT<br>30' at 100° C.<br>65' at 100° C. | — gelled upon mixing - slight exotherm<br>— hard<br>— hard |
| 11 | Epon 828 | 25 | Epi-Cure 855 (Celanese) | 28.1 | RT<br>30' at 100° C.<br>185' at 100° C. | — gelled and turned dark upon mixing<br>— slightly soft<br>— hard |
| 12 | Epon 828 | 25 | dibutyl amine | 18.75 | RT<br>30' at 100° C.<br>210' at 100° C. | — exothermed during mixing<br>— liquid<br>— viscous liquid |
| 13 | Epoxy XB 2793 | 25 | — | — | 3' at 200° C. | — liquid |
| 14 | Epoxy Araldite CY183 | 25 | — | — | 3' at 200° C. | — liquid |

-continued

| Exm. No. | Epoxy | Am't of KL 3-40006* | Amine | Am't of Amine* | Cure | Remarks |
|---|---|---|---|---|---|---|
| 15 | Epon 828 | 25 | Epi-Cure 841 (Celanese) | 16.7 | 1 hr. at RT<br>6 hrs. at RT<br>3' at 150° C. | — gelled<br>— slightly soft<br>— slightly soft hot; solid cold |
| 16 | Epon 828 | — | Epi-Cure 841 (Celanese) | 25 | 44 hrs. at RT<br>3.5 hrs. at RT<br>3' at 150° C. | — hard<br>— no change<br>— soft hot; hard cold |
| 17 | Epon 828 | 25 | Epi-Cure 841 (Celanese) | 20 | 1 hr. at RT<br>3' at 150° C. | — gelled<br>— soft hot; hard cold |
| 18 | Epon 828 | 25 | Epi-Cure 841 (Celanese) | 25 | 45' at RT<br>3' at 150° C. | — gelled<br>— hard hot; hard cold |
| 19 | Epon 828 | 25 | Epi-Cure 841 (Celanese) | 30 | 30' at RT<br>Overnight at RT<br>3' at 150° C. | — gelled<br>— hard<br>— hard hot; hard cold |
| 20 | Epon 828 | — | tetraethylene pentamine | 8.4 | RT | gels on standing after mixing |
| 21 | Epon 828 | — | Epi-Cure 858 | 34.4 | RT | homogeneous solution, appreciable pot life |
| 22 | Epon 828 | — | piperidine | 43.75 | RT | homogeneous mixture, viscous after 6 hrs |
| 23 | Epon 828 | 24.6 | piperidine | 43.48 | RT | viscous after 0.5 hrs. gelling at 1.5 hrs. |
| 24 | Epoxy CY 183 | 25 | — | — | — | homogeneous for 3 days after being mixed at 100° C and cooled |
| 25 | Epoxy CY 183 | — | Shell Curing Agent Z | 23.75 | | homogeneous for 3 hrs. at RT gelled in 3 days |
| 26 | Epoxy CY 183 | 25 | Shell Curing Agent Z | 23.75 | | gelled in 1.25 hrs. at RT |
| 27 | Epoxy XB 2793 | 25 | — | — | | homogeneous liquid for 3 days after mixing at 100° C and cooling |
| 28 | Epoxy XB 2793 | — | Shell Curing Agent Z | 25 | | homogeneous liquid at 3 hrs. at RT<br>gelled in 3 days at RT |
| 29 | Epoxy XB 2793 | 25 | Shell Curing Agent Z | 25 | | gelled in 2 hrs. at RT |
| 30 | Epon 828 | — | Epi-Cure 890 | 18.75 | RT<br>0.75 hr. at 100° C.<br>1.75 hrs. at 100° C. | liquid after 23 hrs.<br>gelled with sticky surface<br>cheesy surface |
| 31 | Epon 828 | — | dibutyl amine | 18.75 | RT<br>3.5 hrs. at 100° C. | liquid after 23 hrs<br>liquid |
| 32 | Epon 828 | — | Epi-Cure 858 | 34.4 | RT<br>0.25 hrs. at 100° C.<br>0.5 hrs. at 100° C. | liquid at 7 hrs. and slightly soft after 23 hrs.<br>gelled<br>rigid |
| 33 | Epi-Rez-510 | — | Aniline | 22.5 | 20 hrs. at RT<br>1.5 hrs. at 100° C.<br>3.5 hrs. at 100° C. | — liquid<br>— liquid<br>— viscosity increased |
| 34 | Epi-Rez-510 | 25 | Aniline | 22.5 | 0.5 hrs. at RT<br>3.5 hrs. at RT<br>24 hrs. at RT<br>0.25 hrs. at 100° C.<br>0.5 hrs. at 100° C. | — viscosity increasing<br>— viscosity increasing<br>— stiff<br>— gelled<br>— hard |

*% by weight based on the epoxy resin
Epon 828 - a diglycidyl ether of 2,2-di(4-hydroxyphenyl)propane available from Shell Chemical Co.
Epoxy XB 2793 - N,N' glycidyl hydantoin derivative available from Ciba Geigy Corp.
Epoxy Araldite CY 183 - a diglycidyl ester of a cycloaliphatic dicarboxylic acid available from Ciba Geigy Corp.
Epi-Rez-510 - a diglycidyl ether of 2,2-di(4-hydroxyphenyl)propane available from Celanese Corp.
KL 3-4006 - bis cyanic acid ester of 2,2-bix(4-hydroxyphenyl)propane available from Mobay Corp.

While the invention and the practice thereof has been described with respect to various embodiments, it is recognized that one skilled in the art may practice further embodiments of this invention without departing from the spirit and scope of the invention as set forth and claimed herein.

What is claimed is:

1. An epoxy composition comprising a) a poly(1,2-epoxide) and in synergistic combination, b) an organic amine having at least two amine hydrogens per molecule, and c) a cyanic acid ester compound.

2. An epoxy composition according to claim 1 wherein the cyanic acid ester is a compound having the following general formula $$R(O-C\equiv N)_x$$

where R is an aromatic radical optionally containing bridging members and having a free valence equal to x, x is an integer of at least 2 and each (O—C≡N) group is always bonded to an aromatic nucleus.

3. An epoxy composition according to claim 2 wherein x is an integer from 2 to 6.

4. An epoxy composition according to claim 2 wherein the organic amine is an organic amine having one or more primary amine groups per molecule.

5. An epoxy composition according to claim 2 wherein the organic amine has at least two secondary amine groups per molecule.

6. An epoxy composition according to claim 2 wherein the organic amine has at least one primary amine group and at least one secondary amine group per molecule.

7. An epoxy composition according to claims 1, 2, 3, 4, 5 or 6 wherein the cyanic acid ester has a methylene bridging group.

8. An epoxy composition according to claims 1, 2, 3, 4, 5 or 6 wherein the cyanic acid ester compound is a cyanic acid ester of 2,2-bis(4-hydroxyphenyl) propane.

9. An epoxy composition according to claims 4, 5 or 6 wherein the organic amine is an aliphatic amine.

10. An epoxy composition according to claims 4, 5 or 6 wherein the organic amine is an aromatic amine.

11. An epoxy composition according to claims 4, 5 or 6 wherein the organic amine is an aralkyl amine.

12. Epoxy compositions according to claims 4, 5 or 6 wherein the organic amine is an alkaryl amine.

13. Epoxy compositions according to claim 4 wherein the organic amine is normally liquid at room temperature.

14. Epoxy compositions according to claim 5 wherein the organic amine is normally liquid at room temperature.

15. Epoxy compositions according to claim 6 wherein the organic amine is normally liquid at room temperature.

16. An epoxy composition according to claim 2 wherein x is 2.

* * * * *